March 24, 1953 A. LORENZ Re. 23,635

RECLINING ARTICLE OF FURNITURE

Original Filed Jan. 22, 1946 4 Sheets-Sheet 1

INVENTOR
ANTON LORENZ
BY
HIS ATTORNEY

RECLINING ARTICLE OF FURNITURE

Original Filed Jan. 22, 1946 4 Sheets-Sheet 2

INVENTOR
ANTON LORENZ
BY
HIS ATTORNEY

RECLINING ARTICLE OF FURNITURE

Original Filed Jan. 22, 1946 4 Sheets-Sheet 3

INVENTOR
ANTON LORENZ
BY
HIS ATTORNEY

March 24, 1953 A. LORENZ Re. 23,635

RECLINING ARTICLE OF FURNITURE

Original Filed Jan. 22, 1946 4 Sheets-Sheet 4

INVENTOR
ANTON LORENZ
BY
HIS ATTORNEY

Reissued Mar. 24, 1953 Re. 23,635

UNITED STATES PATENT OFFICE 23,635

RECLINING ARTICLE OF FURNITURE

Anton Lorenz, Buffalo, N. Y.

Original No. 2,576,466, dated November 27, 1951, Serial No. 642,652, January 22, 1946. Application for reissue March 27, 1952, Serial No. 278,783

16 Claims. (Cl. 155—106)

Matter enclosed in heavy brackets [ ] appears in the original patent but forms no part of this reissue specification; matter printed in italics indicates the additions made by reissue.

This invention relates to an article of furniture, and more particularly to a reclining article of furniture, wherein the back-rest and seat form movable members of a polygonal link-system swingably mounted on a support and wherein the movements of the members of said polygonal link-system are positively controlled by a guiding link pivoted to the support and operatively connected with a member of the polygonal link-system.

An object of the present invention is to provide a convenient controlling mechanism for a leg-rest swingably mounted on the seat of a reclining article of furniture of above described type, by means of which the angle between the leg-rest and the seat is automatically altered in dependence on the movements of the guiding link when the movable members of the reclining article of furniture including the back-rest and the seat are brought from a certain position, such as the sitting position, into another position, such as a reclined position, or vice versa.

A further object of the present invention is to equip a reclining article of furniture of above described type with a controlling mechanism for the leg-rest, which may cause a movement of the leg-rest relative to the seat, when the position of the polygonal link-system is altered, which, however, does not form a positive connection between the leg-rest and the controlling mechanism and permit an independent movement of the leg-rest relative to the seat, when the members of the polygonal link-system are held in a certain position relative to each other.

Another object of the present invention is to improve on reclining articles of furniture of above described type as now ordinarily made.

Figure 2:
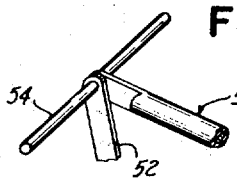
Figure 1:
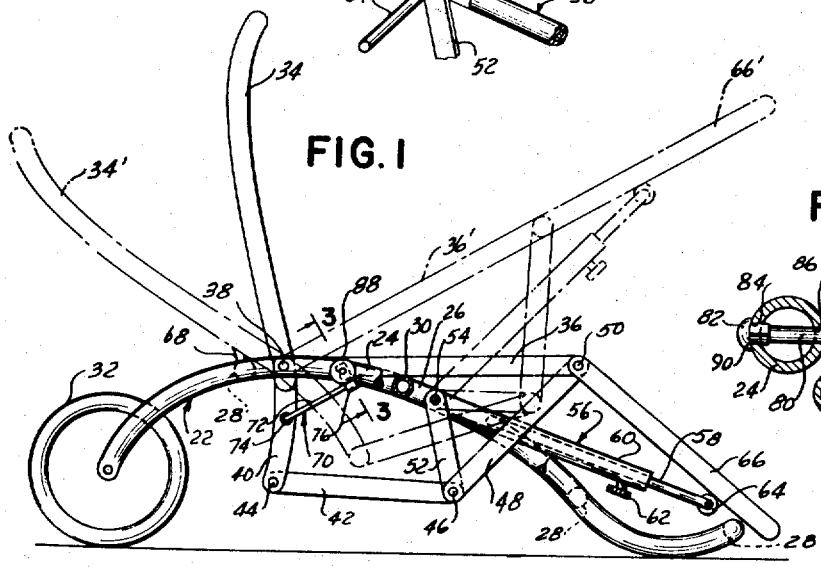
Figure 3:
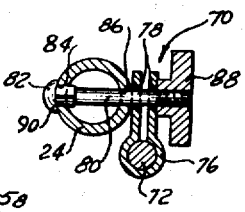
Figure 4:
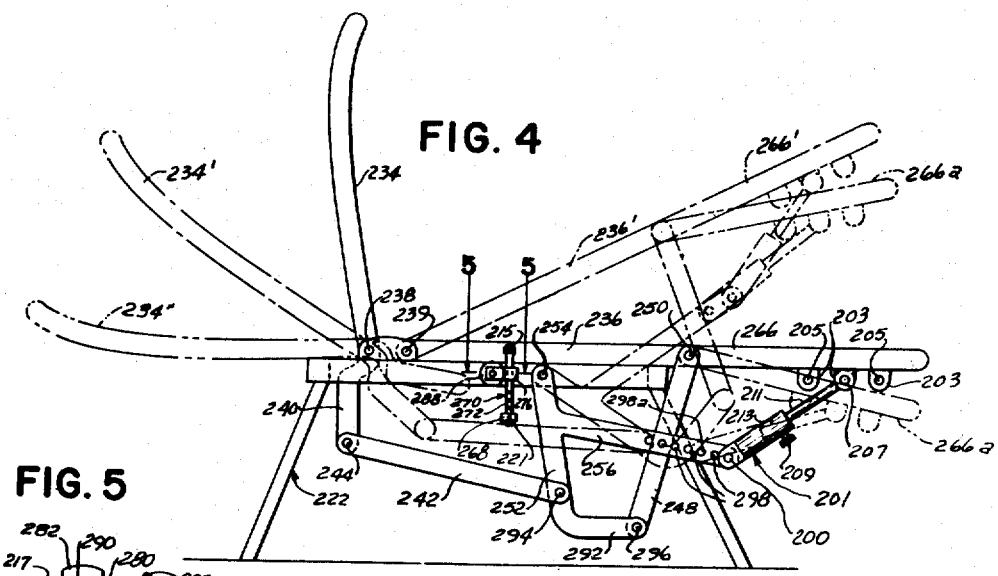
Figure 5:
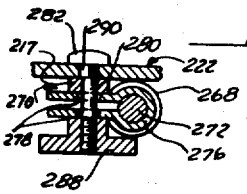
Figure 6:
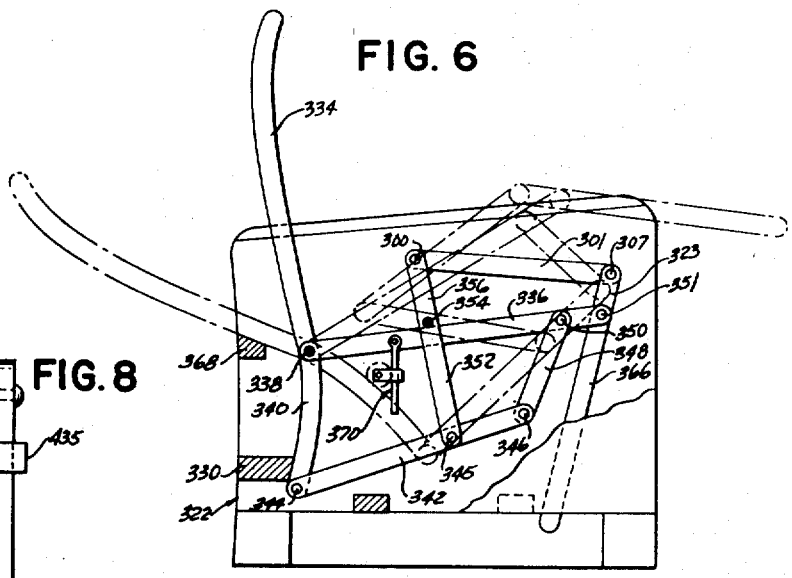
Figure 8:
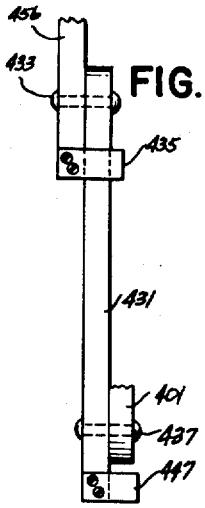
Figure 7:
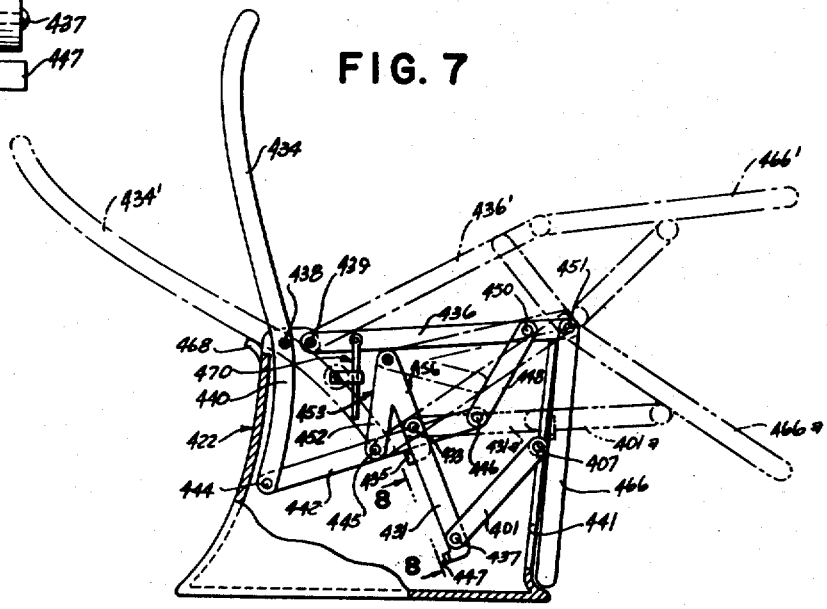
Figure 10:
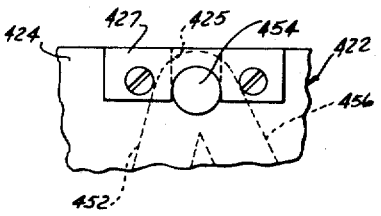
Figure 9:
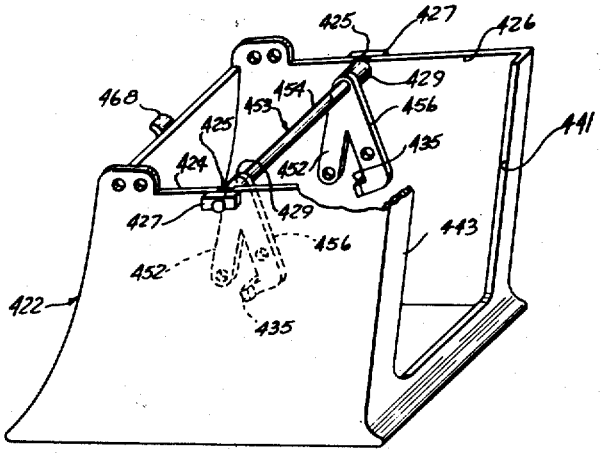
Figure 11:
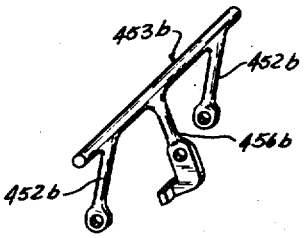
Figure 12:
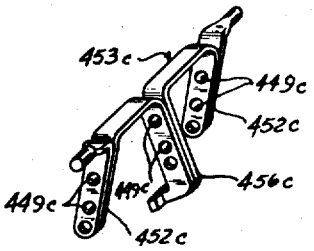
Figure 13:
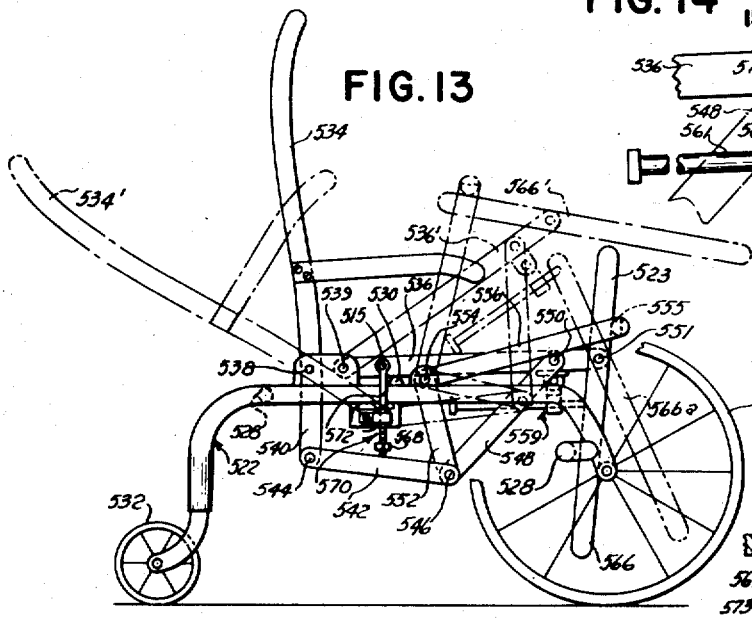
Figure 14:
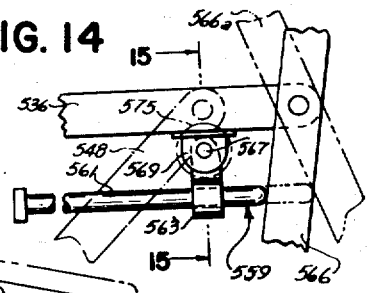
Figure 15:
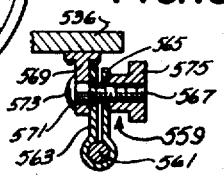
Figure 17:
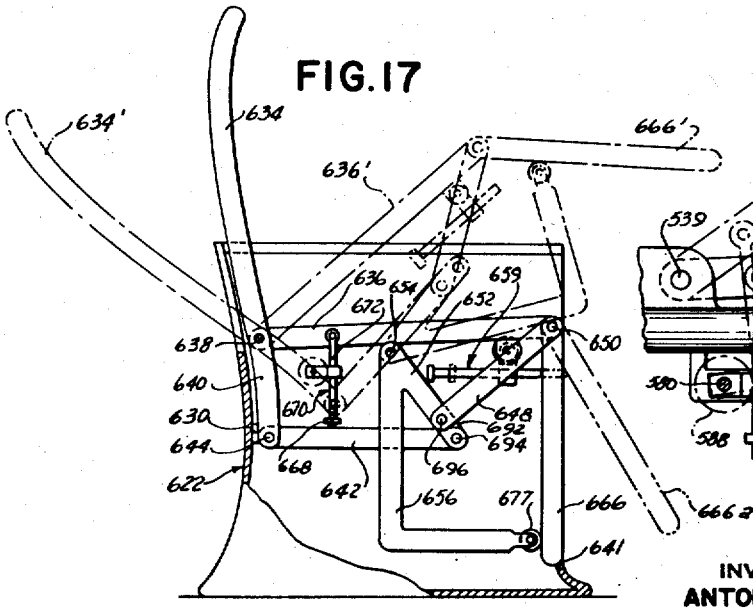
Figure 16:
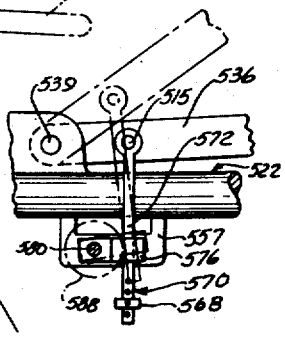

With the above and other objects of the invention in view, the invention consists in the novel construction, arrangement and combination of various devices, elements and parts as set forth in the claims hereof, certain embodiments of the same being described in the specification and being illustrated in the accompanying drawings forming part of this specification, wherein:

Fig. 1 is a side elevational view of a reclining lounget according to the invention, a portion of the support being broken away, Fig. 2 is a fragmentary perspective view of a detail of the lounget shown in Fig. 1, Fig. 3 is a sectional view of the locking device of the lounget shown in Fig. 1, taken on line 3—3 of Fig. 1, Fig. 4 is a side elevational view of a different embodiment of a convertible reclining lounget according to the invention, Fig. 5 is a sectional view of the locking device of the lounget shown in Fig. 4 taken on line 5—5 of Fig. 4, Fig. 6 is a side elevational view of a reclining arm-chair according to the invention, a portion of a side wall of the chair being broken away, Fig. 7 is a side elevational view of another embodiment of a reclining chair according to the invention, a portion of the side wall of the support being broken away, Fig. 8 is a view of a detail of the chair shown in Fig. 7, taken along line 8—8 of Fig. 7, Fig. 9 is a perspective view of the support of the chair shown in Fig. 7, the controlling unit of said chair being shown mounted in said support, Fig. 10 is a fragmentary side elevational view of the safety member for holding the controlling unit of the chair shown in Fig. 7 in its position, Fig. 11 is a perspective view of a different embodiment of a controlling unit which may be used in the chair shown in Fig. 7, Fig. 12 is a perspective view of a further embodiment of a controlling unit which may be used in the chair shown in Fig. 7, Fig. 13 is a side elevational view of a reclining wheel chair according to the invention, Fig. 14 is a fragmentary side elevational view of the front portion of the wheel chair shown in Fig. 13, illustrating the holding device for the leg-rest, Fig. 15 is a sectional view of the holding device of the wheel chair shown in Fig. 13, taken on line 15—15 of Fig. 14, Fig. 16 is a fragmentary side elevational view of the locking device of the wheel chair shown in Fig. 13, and Fig. 17 is a side elevational view of another embodiment of a reclining arm-chair according to the invention, a portion of a side wall of the support being broken away.

Referring now to Fig. 1, 22 generally indicates the support of a lounget. Said support 22 comprises the side frames 24, 26 connected with each other by transverse rods 28 and 30. The support 22 may be moved along the ground by means of wheels 32 (only one being shown) journalled in suitable bearings of the support.

The back-rest 34 and the rear portion of a seat 36 are coaxially pivoted to the support 22 at 38. The back-rest 34 has a downward extension 40 substantially in the center of the lounget. The rear end of a connecting link 42, hereinafter called a lower connecting link, is pivoted to said extension 40 of the back-rest 34 at 44. The other end of said lower connecting link 42 is pivoted at 46 to the adjacent end of another connecting link 48, hereinafter called the front connecting link. The upper end of said front connecting link 48 is pivoted to the front portion of the seat 36 at 50. The pair of connecting links 42, 48, pivotally connected with each other at 46 form a link mechanism. Said downward extension 40, said link mechanism 42, 48 and said seat 36 form the movable members of a constrained kinematic polygonal link-system in the shape of a quadrilateral link-system which is swingably mounted on the support 22 at 38 for movement about a single axis. The movements of the movable members 40, 42, 48, 36 of said quadrilateral link-system are controlled by a guiding link 52, the lower end of which is connected with the pivotal connection 46 between the connecting links 42 and 48. The upper end of said guiding link 52 is rigidly connected with a transverse rod 54 journalled in suitable bearings of the support 22 (see Figs. 1 and 2). One end of a telescopic controlling element of controlling bar 56 is also rigidly connected with said transverse rod 54, so that said controlling bar 56 participates in the movements of the guiding link 52. The element 58 slidably arranged in the hollow element 60 of the telescopic controlling bar 56 may be held in any desired position relative to said hollow element 60 by means of a set screw 62. A roller 64 journalled in said element 58 of the telescopic controlling bar 56 is in shiftable engagement with a leg-rest 66 swingably mounted on the front portion of the seat 36 at 50. Thus, when the occupant of the lounget leans the weight of his body against the back-rest 34, whereby the latter is swung about its pivot 38 into a reclined position, for example the position 34', the seat 36 controlled by the movements of the guiding link 52 is brought into the reclined position 36', and the leg-rest 66 is swung by means of the controlling bar 56 about its pivot 50 into the reclined position 66' in dependence on the movements of the guiding link 52.

The sitting position of the movable members of the lounget shown in full lines is limited by the transverse rod 30 of the support 22 forming a stop on which the seat 366 comes to a rest. The extreme reclined position of the movable members of the lounget shown in dash and dot lines is limited by a stop 68 mounted on the support 22 for cooperation with the back-rest.

The movable members of the lounget may be held in said extreme reclined position or in any other intermediate reclined position by means of a locking device generally indicated by 70. As best shown in Figs. 1 and 3, said locking device 70 comprises a locking rod 72 swingably mounted on the extension 40 of the back-rest 34 at 74. The free end of said locking rod 72 is in slidable engagement with a clamping sleeve 76 having bores 78 for engagement with a bolt 80. Said bolt 80 having a head 82 and passing through apertures 84, 86 of the side frame 24 has a threaded end for engagement with the threaded bore of a locking knob 88. A square portion 90 of the bolt 80 engaged with the corresponding square aperture 84 of the tubular side frame 24 prevents the bolt 80 from rotation when the knob 88 is turned. When the locking knob 88 is loosened, the locking rod 72 may freely slide in the clamping sleeve 76, so that the movable members of the lounget may be readily moved from one position into another one. When the locking knob 88 is tightened, the clamping sleeve 76 is tightly pressed on the locking rod 72, whereby the latter and the movable members of the lounget are held in their position. Of course, any other suitable locking device may be used instead of the locking device 70 shown in the drawings.

As mentioned above, the controlling bar 56 is of the telescopic type, so that its effective length may be varied and adjusted by loosening the set screw 62 displacing the member 58 relative to the hollow member 60, and holding the member 58 in the displaced position by tightening against the set screw 62. When the movable members of the quadrilateral link-system 36, 40, 42, 48 are held in a certain position by means of the stop 30 or by means of the locking device 70, the angle between the leg-rest 66 and the seat 36 may be altered by means of such an adjustment of the effective length of the telescopic controlling bar 56.

According to the embodiment of a lounget shown in Fig. 4, the back-rest 234 is pivoted to the support 222 at 238. The rear end of the seat 236 is pivoted to said support 222 at 239 at a point spaced from the pivotal connection 238 between the back-rest 234 and the support 222. The back-rest 234 has an offset downward extension 240 pivoted to the rear end of the lower connecting link 242 at 244. The other end of said lower connecting link 242 is pivotally connected with one end of an intermediate connecting link 292 at 294. The other end of said intermediate connecting link 292 is pivoted at 296 to one end of the front connecting link 248, the other end of which is pivoted to the seat 236 at 250. Thus, the downward extension 240, the link-mechanism 242, 292, 248 and the seat 236 form the movable members and the portion of the support 222 between the pivots 238 and 239 forms the stationary member of a constrained kinematic polygonal link-system in the shape of a hexagonal link-system. The movements of the movable members of said hexagonal link-system are controlled by a guiding link 252, the upper end of which is pivoted to the support 222 at 254, and the lower end of which is rigidly connected with the intermediate connecting link 292. In the embodiment shown in Fig. 4, said guiding link 252 is integral with the intermediate connecting link 292, but of course the guiding link and the intermediate connecting link could be made of two separate pieces rigidly connected with each other by suitable means, for example screws.

The movements of the leg-rest 266 swingably mounted on the seat 236 at 250 are controlled by the following mechanism in dependence on the movements of the guiding link 252. One end of the controlling bar 256 is rigidly connected with an intermediate point of the guiding link 252. According to Fig. 4, the controlling bar 256 is integral with the guiding link 252, but of course, the controlling bar and the guiding link could be made of two separate members rigidly connected with each other by suitable means, for example screws. The other end of said controlling bar 256 is provided with a series of holes 298. A pivot 200 pivotally connecting one end of a telescopic controlling link 201 with said controlling bar 256 may be selectively engaged with one hole of said series of holes 298 whereby the effective length of the controlling bar 256 may be adjusted. The leg-rest 266 is provided with a series of lugs 203, each of which has a bore 205. A pivot 207 may be selectively engaged with a bore 205 of said series of lugs 203 for a pivotal connection of the other end of the controlling link 201 with the leg-rest 266. The selective engagement of the pivot 207 with a bore of one of said series of lugs 203 permits an adjustment of the pivotal connection between the controlling link 201 and the leg-rest 266 relative to the leg-rest. Furthermore, the effective length of the controlling link 201 may be varied and adjusted by loosening the set screw 209, displacing the slidable member 211 relative to the hollow member 213 of the telescopic controlling link 201 and holding the slidable member 211 in the displaced position by tightening the set screw 209.

When the back-rest 234 is swing about its pivot 238 into a reclined position, for example the extreme reclined position 234', the seat 236 is swung about its pivot 239 into the extreme reclined position 236' by means of the control of the guiding link 252. Furthermore, the leg-rest is brought into the position 266' by means of the controlling mechanism 256, 201.

The movable members of the lounget may be held in any desired position by means of the locking device generally indicated by 270. As best shown in Figs. 4 and 5, said locking device 270 comprises a locking rod 272 swingably mounted on the seat 236 at 215. Said locking rod 272 is slidably engaged with a clamping sleeve 276 having bores 278 for engagement with a bolt 280. Said bolt 280 has a square portion 290 inserted into a corresponding square aperture of the frame of the support 222. A collar 217 is placed on the bolt 280 between the surface of the support 222 and the clamping sleeve 276. The head 282 of the bolt 280 rests against a surface of the frame of the support 222, and a locking knob 288 is screwed on the threaded end of the bolt 280. When the adjusting knob 288 is loosened, the locking rod 272 may freely slide in the clamping sleeve 276, so that the movable members of the lounget may be freely moved from one position into another one. When the locking knob 288 is tightened, the clamping sleeve 276 is tightly pressed against the locking rod 272, whereby the latter and the seat 236 and those movable members of the lounget which are positively connected with the seat are held in their position.

The locking rod 272 has a series of bores 219. A pin 221 passing through a hole of a stop collar 268 adjustably arranged on the locking rod 272 may be selectivey engaged with one hole of the series of holes 219, whereby said stop collar 268 is held in a predetermined position on the locking rod 272. When the seat 236 is lifted, the locking rod 272 slides in the clamping sleeve 276 until the stop collar 268 abuts against said clamping sleeve, whereby the extreme reclined position 236' of the seat and the extreme reclined position of the other movable members of the lounget positively connected with the seat is limited. As will be readily understood, said extreme reclined position of the various movable members of the lounget may be varied and adjusted by a corresponding adjustment of the position of the stop collar 268 on the locking rod 272. The substantially horizontal sitting position of the seat 236 is limited by the upper edge of the support 222 on which the seat comes to a rest.

At least one pivotal connection of the link-mechanism 242, 292, 248, for example the pivotal connection 244 is disengageable, so that the back-rest 234 may be swung independently of the seat 236 about its pivot 238, for example into the position 234'' wherein it abuts against the upper edge of the support. Thus, the lounget shown in Fig. 4 may be converted into a couch-like furniture, when the back-rest is held by the support 222 in said substantially horizontal position 234'' substantially in alignment with the seat 236 held in its sitting position by the support 222. When the telescopic controlling link 201 is of the adjusted effective length as shown in full lines in Fig. 4, and when its ends are pivoted at 200 and 207 with the controlling bar 256 and the leg-rest 266 respectively as shown in full lines, the leg-rest 266 is likewise held in a substantially horizontal position in alignment with the seat 236.

When the seat 236 is held in a certain position either by the locking device 270 or by the upper edge of the support 222, the leg-rest 266 may be brought into a different position relative to the seat 236 by varying the effective length of the telescopic link 201 and/or by varying the effective length of the controlling bar 256 and/or by connecting the controlling link 201 with a different lug 203. If, for example, the effective length of the controlling link 201 and its pivotal connection 207 with the center lug 203 remains unchanged, if, however, the pivot 200 passing through a bore of the controlling link 201 in inserted into the hole 298a of the controlling bar 256, the leg-rest is brought into the position 266a. Now, when all pivotal connections of the link mechanism 242, 292, 248, are in active engagement, when for example the pivotal connection 244 between the lower connecting link 242 and the extension 240 of the back-rest 234 is reinstated, the leg-rest will reach the position 266a', when the back-rest and the seat are swung into the extreme reclined position 234', 236'.

According to the embodiment of a reclining arm-chair shown in Fig. 6, the back-rest 334 and the seat 336 are coaxially pivoted to the connected side frames of the support 322 at 338. The rear end of the link mechanism comprising the lower connecting link 342 pivotally connected at 346 with the front connecting link 348 is pivotally connected with the downward extension 340 of the back-rest 334 at 344. The front end of said link mechanism 342, 348 is pivoted to the seat 336 at 350. The movements of the quadrilateral link-system 336, 340, 342, 348 are controlled by the guiding link 352, the lower end of which is pivoted to the connecting link 342 at 345. The upper portion of said guiding link 352 is swingably mounted on the support 322 at 354.

The leg-rest 366 swingably mounted on the seat 336 at 351 has an upward extension 323 projecting beyond the pivotal connection 351 between the leg-rest 366 and the seat 336. One end of a controlling link 301 is pivoted at 307 to said extension 323 of the leg-rest 366, and the other end of said controlling link 301 is pivoted at 300 to a controlling bar 356 integral with the guiding link 352.

When the back-rest 334 is swung from the sitting position shown in full lines into the extreme reclined position shown in dash and dot lines, the seat 336 and the leg-rest 366 are brought from the position shown in full lines into the position shown in dash and dot lines by the control of the guiding link 352.

The sitting position of the movable members of the chair is limited by the cross bar 330 of the support 322 cooperating with the downward extension 340 of the back-rest 334, and the extreme reclined position of the movable members of the chair is limited by the cross bar 368 of the support 322 cooperating with the back-rest 334.

The movable members of the chair may be held in any desired position by means of the locking device 370.

According to the embodiment of a reclining chair shown in Fig. 7, the back-rest 434 is pivoted to the casing-like support 422 at 438. The rear end of the seat 436 is swingably mounted on said support 422 at 439 at a point spaced from the pivotal connection 438 between the back-rest 434 and the support 422. The back-rest 434 has a downward extension 440. On each side of the chair, the rear end of a lower connecting link 442 is pivoted to said downward extension 440 at 444. Each lower connecting links 442 is pivotally connected at 446 with one end of a front connecting link 448, the other end of which is pivoted to the seat 436 at 450. On each side of the chair, the lower end of a guiding link 452 is pivoted to the lower connecting link 442 at 445. As best shown in Figs. 7, 9, and 10, each guiding link 452 integral with a controlling bar 456 is rigidly connected with a transverse rod 454 rotatably arranged in recesses 425 of the side walls 424, 426 of the support 422. Said recesses 425 are open at the top. Thus, the controlling unit 453 formed by the transverse rod 454 and the two members 452, 456 rigidly connected with each other may be readily inserted into the recesses 425 of the support 422 from above. Safety blocks 427 attached to the side walls of the support 422 by screws may hold said unit 453 in its position when inserted into said recesses 425. Collars 429 arranged on the rod 454 between the members 452, 456 and the side walls of the support 422 prevent an axial displacement of the unit 453. Thus, the guiding link 452 is again swingably mounted on the support 422 and may control the movements of the movable members of the quinquelateral link-system formed by the movable members 440, 442, 448, 436 and the stationary member of the portion of the support 422 between the pivots 438 and 439. An adjusting element or bar 431 (see Figs. 7 and 8) is swingably mounted at 433 on each controlling bar 456. A stop 435 secured to the controlling bar 456 by screws is arranged for engagement with the swingable adjusting bar 431, so as to hold same in alignment with the controlling bar 456 as shown in full lines in Fig. 7. One end of a controlling link 401 is pivoted to said swingable adjusting bar 431 at 437, the other end of said controlling link 401 is pivoted at 407 to the leg-rest 466 swingably mounted on the seat 436 at 451. Each controlling link 401 and each adjusting bar 431 may pass through a slot 441 in the front wall 443 of the support 422.

The sitting position of the movable members of the chair shown in full lines in Fig. 7 is limited by the upper edge of the support 422 on which the seat 436 comes to a rest.

When the back-rest 434 is swung about its pivot 438, the back-rest, seat, and leg-rest may be brought into the extreme reclined position 434', 436', 466', limited by an abutment of the back-rest against the stop 468 mounted on the support 422.

The movable members of the chair may be held in any desired position by means of the locking device 470.

As mentioned above, the adjusting bar 431 is swingable about the pivot 433. If the back-rest and seat are held in a predetermined position, for example the sitting position shown in full lines in Fig. 7, by means of the locking device 470, the leg-rest 466 may be swung by hand about its pivot 451 into the position 466a, wherein the controlling link and the adjusting bar are in the positions 431a and 401a in alignment with each other. Now, when a slight pressure is exerted on the leg-rest, for example by the legs of the occupant resting in the chair, the controlling link and the adjusting bar are moved slightly beyond said straight line, until a stop 447 secured to the adjusting bar 431 by screws abuts against the controlling link, whereby said elements are locked and held in a predetermined position relative to each other.

Fig. 11 illustrates a different embodiment of a controlling unit 453b, which may be substituted for the controlling unit 453 shown in Fig. 8. Said controlling unit 453b is made of an integral piece of material in such a shape, that two guiding links 452b and a single controlling bar 456b are formed. Of course, if the controlling unit 453b is used, only a single controlling link is arranged for connecting the single controlling bar 456b with the leg-rest.

Fig. 12 illustrates a further embodiment of a controlling unit 453c which may be substituted for the controlling unit 453 shown in Fig. 9. According to Fig. 12, the controlling unit 453c is composed of a plurality of members rigidly connected with each other by rivets 449c or the like. The members of the controlling unit 453c are shaped so as to form two guiding links 452c and a single controlling bar 456c.

According to the embodiment of a reclining wheel chair shown in Fig. 13, the support 522 is provided with wheels 532 of any conventional construction. The side frames of the support 522 are connected with each other by transverse rods 528.

The back-rest 534 is pivoted to the support 522 at 538. The seat 536 is pivoted to said support 522 at 539 spaced from the pivot 538. The rear end of a lower connecting link 542 arranged on each side of the wheel chair is pivoted to the downward extension 540 of the back-rest at 544. The other end of said lower connecting link 542 is pivoted at 546 with the lower end of the guiding link 552 and one end of the front connecting link 548. The upper end of said front connecting link 548 is pivoted at 550 to the seat 536.

The leg-rest 566 swingably mounted on the seat 536 at 552 has an upward extension 523. A controlling bar 556 integral with the guiding link 552 swingably mounted on the support 522 at 554 has a controlling surface 555 in the shape of a cam, which is in loose contact with said extension 523 of the leg-rest 566. The extension 523 of the leg-rest may be held against said controlling cam 555 by means of a spring (not shown). When the controlling cam 555 of the controlling bar 555 is in engagement with said extension 523 of the leg-rest 566, the movements of the leg-rest are controlled in dependence on the movements of the guiding link 552. Thus, if the back-rest 534 is swung about its pivot 538 into the reclined position 534', the seat 536 and the leg-rest 566 controlled by said guiding link 552 are brought into the position 536' and 566'.

The sitting position of the movable members of the chair is limited by the stop 530 mounted on the support 522, and the extreme reclined position of the movable members of the chair is limited by the adjustable stop collar 568 mounted on the locking rod 572 of the locking device generally indicated by 570. Said locking device 570 with the adjustable stop collar 568 is of the same general organization as the locking device 270 described above in connection with Figs. 4 and 5. As best shown in Fig. 16, the locking rod 570 is swingably mounted on the seat 536 at 515, and the bolt 580 carrying the clamping sleeve 576 and the locking knob 588 is mounted on a bracket 557 attached to a side frame of the support 522.

As mentioned above, the controlling cam 555 is in loose contact with the extension 523 of the leg-rest 566, so that the leg-rest 566 with its extension 523 may be disengaged from said controlling cam 555, when the seat 536 is held by the locking device 570 in a certain position. For example, the extension 523 of the leg-rest 566 may be grasped by hand, and the leg-rest may be swung into the position 566a, while the seat 536 remains in the sitting position shown in full lines. A holding device generally indicated by 559 and mounted on the seat 536 may be used for holding the leg-rest 566 in a certain position, for example said position 556a relative to the seat 536. As best shown in Figs. 14 and 15, said holding device 559 comprises a rod 561 slidably engaged with a clamping sleeve 563 having bores 565 for receiving a bolt 567 mounted on a lug 569 attached to the seat 536. A square portion 571 of the bolt 567 having a head 573 is engaged with a corresponding square aperture of the lug 569, so that the bolt 567 is prevented from rotation when a locking knob 575 screwed on the threaded end of the bolt 567 is turned. Assuming the rod 561 is in the position shown in full lines in Fig. 14, and the leg-rest has been swung by hand from the position shown in full lines into the position 566a. In order to hold said leg-rest in said position 566a, the locking knob 575 of the holding device 559 is loosened, whereupon the rod 561 may be axially displaced in the clamping sleeve 563 until it abuts against said leg-rest in the position 566a as shown in dash and dot lines. Now, the locking knob 575 is tightened, whereby the clamping sleeve 563 is tightly pressed on the rod 561 so as to hold same and the leg-rest in the dash and dot line position. When, after a loosening of the locking device 570 the movable members of the chair are brought into a reclined position, the leg-rest will remain in said position 566a relative to the seat 536 until the controlling cam 555 of the controlling bar 556 abuts against the extension 523 of the leg-rest 566. If, after such an abutment, the movement of the movable members of the wheel chair is continued, the position of the leg-rest 566 relative to the seat 536 is altered by the controlling cam 555 in dependence on the movements of the guiding link 552.

According to the embodiment of a reclining arm-chair shown in Fig. 17 the back-rest 634 and the seat 636 are coaxially pivoted to the support 622 at 638. The downward extension 640 of the back-rest 634 is pivoted at 644 to the rear end of the lower connecting link 642. The other end of said lower connecting link is pivoted at 694 to an intermediate connecting link 692, which, in turn, is pivoted at 696 to one end of the front connecting link 648. The upper end of said front connecting link 648 is pivoted to the seat 636 at 650. A guiding link 652 integral with the intermediate connecting link 692 is swingably mounted on the support at 654. A bent controlling bar 656 integral with the guiding link 652 carries a controlling surface in the shape of a roller 677 for loose contact with the leg-rest 666 swingably mounted on the seat 636 at 650. The leg-rest 666 and the controlling bar 656 may pass through a slot 641 in the front wall of the support 622. The movable downward extension 640, the movable links 642, 692, 648 and the movable seat 636 form the movable members of a constrained kinematic polygonal link-system in the shape of a quinquelateral link-system swingably mounted on the support at 638.

When the leg-rest 666 is in engagement with the controlling roller 677 and the back-rest 634 is swung about its pivot 638 into the extreme reclined position 634′, the seat and the leg-rest are brought into the position 636′, 666′.

The movable members of the chair may be held in any desired position by means of the locking device 670 of the type described above in connection with Figs. 4 and 5.

The sitting position of the movable members of the chair is limited by a stop 630 mounted on the support 622 for cooperation with the downward extension 640 of the back-rest 634, and the extreme reclined position is limited by the stop collar 668 adjustably mounted on the locking rod 672 of the locking device 670.

The leg-rest 666 may be disengaged from the roller 677 of the controlling bar 656, so that, if desired, the leg-rest may be brought into a different position relative to the seat 636, for example into the position 666a. The leg-rest may be held in said position 666a by means of a holding device 659 mounted on the seat 636. The holding device 659 is of the same construction as the holding device shown in Figs. 14 and 15.

It is understood, that certain parts, elements, or mechanisms shown in a certain figure may be substituted for corresponding parts, elements, or mechanisms of the embodiments shown in other figures of the drawings.

I have described preferred embodiments of my invention, but it is understood that this disclosure is for the purpose of illustration, and that various omissions or changes in shape, proportion, and arrangement of parts, as well as the substitution of equivalent elements for those, herein shown and described, may be made without departing from the spirit and scope of the invention as set forth in the appended claims.

What I claim is:

1. An article of repose for supporting the body of a person, comprising in combination: a support, a constrained linkage having stationary link-means and a plurality of movable links, said stationary link-means being included in said support, said movable links including a seat-member, a downward extension of a back-rest-member, a guiding link and a chain of connecting links including a lower connecting link at one end of the chain and a front connecting link at the other end of the chain, at least one of said connecting links being arranged below the plane of the seat-member, the upper end of said guiding link being pivoted to said support, the lower end of said guiding link being connected with at least one of said connecting links, said lower connecting link being pivoted to the downward extension of the back-rest-member, said front connecting link being pivoted to the front portion of said seat-member, means pivotally connecting at least one of said back-rest- and seat-members with said support, a leg-rest swingably mounted on the front portion of said seat-member, a controlling member fixedly connected to said guiding link, and means, interposed between said controlling member and said leg-rest, for effecting movement of the latter in coordination with said controlling member.

2. An article of repose for supporting the body of a person, comprising in combination: a support, a constrained linkage having stationary link-means and a plurality of movable links, said stationary link-means being included in said support, said movable links including a seat-member, a downward extension of a back-rest-member, a guiding link and a chain of connecting links including a lower connecting link at one end of the chain and a front connecting link at the other end of the chain, at least one of said connecting links being arranged below the plane of the seat-member, the upper end of said guiding link being pivoted to said support, the lower end of said guiding link being connected with at least one of said connecting links, said lower connecting link being pivoted to the downward extension of the back-rest-member, said front connecting link being pivoted to the front portion of said seat-member, means pivotally connecting at least one of said back-rest- and seat-members with said support, a leg-rest swingably mounted on the front portion of said seat-member, a controlling member fixedly connected to said guiding link, and a controlling link pivoted at its rear end to said controlling member and at its front end to said leg-rest.

3. In an article of repose as claimed in claim 2 said controlling link being of adjustable length, and means for maintaining a predetermined adjustment in the length of said controlling link.

4. In an article of repose as claimed in claim 1, first holding means arranged on said article for cooperation with the seat-member so as to hold same in a substantially horizontal sitting position, at least one connection of said chain of connecting links being disengageable so as to permit a swinging of the back-rest-member into a substantially horizontal position independently of the seat-member, and second holding means arranged on said article for cooperating with the back-rest-member so as to hold same in said substantially horizontal position.

5. In an article of repose as claimed in claim 1, first holding means arranged on said article for cooperation with the seat-member so as to hold same in a substantially horizontal sitting position, at least one connection of said chain of connecting links being disengageable so as to permit a swinging of the back-rest-member into a substantially horizontal position independently of the seat-member, second holding means arranged on said article for cooperation with the back-rest-member so as to hold same in said substantially horizontal position, said controlling link being of adjustable length, and means for maintaining a predetermined adjustment in the length of said controlling link so as to hold said leg-rest in a substantially horizontal position.

6. In an article of repose as claimed in claim 2, said controlling member extending upwardly beyond the pivotal connection between the guiding link and the support, said leg-rest having an extension projecting upwardly beyond its pivotal connection with the seat-member, and the front end of said controlling link being pivoted to said extension of the leg-rest.

7. An article of repose for supporting the body of a person, comprising in combination: a support, a constrained linkage having stationary link-means and a plurality of movable links, said stationary link-means being included in said support, said movable links including a seat-member, a downward extension of a back-rest-member, a guiding link and a chain of connecting links including a lower connecting link at one end of the chain and a front connecting link at the other end of the chain, at least one of said connecting links being arranged below the plane of the seat-member, the upper end of said guiding link being pivoted to said support, the lower end of said guiding link being connected with at least one of said connecting links, said lower connecting link being pivoted to the downward extension of the back-rest-member, said front connecting link being pivoted to the front portion of said seat-member, means pivotally connecting at least one of said back-rest- and seat-members with said support, a leg-rest swingably mounted on the front portion of the seat-member, a controlling member fixedly connected to said guiding link, an adjusting bar swingably mounted on said controlling member, a controlling link pivoted at its rear end to said adjusting bar and at its front end to said leg-rest, and means associated with said controlling member and said adjusting bar for holding the latter in a predetermined position relative to said controlling member.

8. In an article of repose as claimed in claim 7, means associated with said adjusting bar and said controlling link for holding said adjusting bar in a predetermined position relative to said controlling link.

*9. An article of repose for supporting the body of a person, comprising in combination: a support, a constrained linkage having stationary link-means and a plurality of movable links, said stationary link-means being included in said support, said movable links including a seat-member, a downward extension of a back-rest-member, a guiding link and a chain of connecting links including a lower connecting link at one end of the chain and a front connecting link at the other end of the chain, at least one of said connecting links being arranged below the plane of the seat member, one end of said guiding link being pivoted to said support, the other end of said guiding link being connected with at least one of said connecting links, said lower connecting link being pivoted to the downward extension of the back-rest-member, said front connecting link being pivoted to the front portion of said seat member, means pivotally connecting at least one of said back-rest- and seat-members with said support, a leg-rest swingably mounted on the front portion of said seat member, a controlling member fixedly connected to said guiding link, and means, interposed between said controlling member and said leg-rest, for effecting movement of the latter in coordination with said controlling member.*

*10. An article of repose for supporting the body of a person, comprising in combination: a support, a constrained linkage having stationary link-means and a plurality of movable links, said stationary link-means being included in said support, said movable links including a seat-member, a downward extension of a back-rest-member, a guiding link and a chain of connecting links including a lower connecting link at one end of the chain and a front connecting link at the other end of the chain, at least one of said connecting links being arranged below the plane of the seat-member, one end of said guiding link being pivoted to said support, the other end of said guiding link being connected with at least one of said connecting links, said lower connect-*

*ing link being pivoted to the downward extension of the back-rest-member, said front connecting link being pivoted to the front portion of said seat-member, means pivotally connecting at least one of said back-rest- and seat-members with said support, a leg-rest swingably mounted on the front portion of said seat-member, a controlling member fixedly connected to said guiding link, and a controlling link pivoted at its rear end to said controlling member and at its front end to said leg-rest.*

*11. In an article of repose as claimed in claim 10, said controlling link being of adjustable length, and means for maintaining a predetermined adjustment in the length of said controlling link.*

*12. In an article of repose as claimed in claim 9, first holding means arranged on said article for cooperation with the seat-member so as to hold same in a substantially horizontal sitting position, at least one connection of said chain of connecting links being disengageable so as to permit a swinging of the back-rest-member into a substantially horizontal position independently of the seat-member, and second holding means arranged on said article for cooperating with the back-rest-member so as to hold same in said substantially horizontal position.*

*13. In an article of repose as claimed in claim 9, first holding means arranged on said article for cooperation with the seat-member so as to hold same in a substantially horizontal sitting position, at least one connection of said chain of connecting links being disengageable so as to permit a swinging of the back-rest-member into a substantially horizontal position independently of the seat-member, second holding means arranged on said article for cooperation with the back-rest-member so as to hold same in said substantially horizontal position, said controlling link being of adjustable length, and means for maintaining a predetermined adjustment in the length of said controlling link so as to hold said leg-rest in a substantially horizontal position.*

*14. In an article of repose as claimed in claim 10, said controlling member extending upwardly beyond the pivotal connection between the guiding link and the support, said leg-rest having an extension projecting upwardly beyond its pivotal connection with the seat-member, and the front end of said controlling link being pivoted to said extension of the leg-rest.*

*15. An article of repose for supporting the body of a person, comprising in combination: a support, a constrained linkage having stationary link-means and a plurality of movable links, said stationary link-means being included in said support, said movable links including a seat-member, a downward extension of a back-rest-member, a guiding link and a chain of connecting links including a lower connecting link at one end of the chain and a front connecting link at the other end of the chain, at least one of said connecting links being arranged below the plane of the seat member, one end of said guiding link being pivoted to said support, the other end of said guiding link being connected with at least one of said connecting links, said lower connecting link being pivoted to the downward extension of the back-rest-member, said front connecting link being pivoted to the front portion of said seat-member, means pivotally connecting at least one of said back-rest- and seat-members with said support, a leg-rest swingably mounted on the front portion of the seat-member, a controlling member fixedly connected to said guiding link, an adjusting bar swingably mounted on said controlling member, a controlling link pivoted at its rear end to said adjusting bar and at its front end to said leg-rest, and means associated with said controlling member and said adjusting bar for holding the latter in a predetermined position relative to said controlling member.*

*16. In an article of repose as claimed in claim 15, means associated with said adjusting bar and said controlling link for holding said adjusting bar in a predetermined position relative to said controlling link.*

ANTON LORENZ.

REFERENCES CITED

The following references are of record in the file of this patent or the original patent:

UNITED STATES PATENTS

| Number | Name | Date |
|---|---|---|
| 58,343 | Hall | Sept. 25, 1866 |
| 712,743 | Van Slyke | Nov. 4, 1902 |
| 941,555 | Berzon | Nov. 30, 1909 |
| 2,227,597 | Luckhardt | Jan. 7, 1941 |
| 2,433,521 | Lorenz | Dec. 30, 1947 |
| 2,578,708 | Lorenz | Dec. 18, 1951 |

FOREIGN PATENTS

| Number | Country | Date |
|---|---|---|
| 39,393 | Germany | June 9, 1887 |